(12) United States Patent
Hu

(10) Patent No.: US 7,540,346 B2
(45) Date of Patent: Jun. 2, 2009

(54) AUTOMOTIVE VEHICLE EMPLOYING KINETIC ENERGY STORAGE/REUSE CAPABILITY

(76) Inventor: Loong-Chiang Hu, No. 12, Lane 162, Kuang-Ming Rd., Wu-Jih Hsiang, Taichung Hsien (TW)

( * ) Notice: Subject to any disclaimer, the term of this patent is extended or adjusted under 35 U.S.C. 154(b) by 457 days.

(21) Appl. No.: 11/583,023

(22) Filed: Oct. 19, 2006

(65) Prior Publication Data
US 2008/0105475 A1     May 8, 2008

(51) Int. Cl.
*B60K 1/00* (2006.01)
(52) U.S. Cl. .................................. 180/165; 180/65.1
(58) Field of Classification Search .............. 180/65.1, 180/165, 54.1, 65.31
See application file for complete search history.

(56) References Cited

U.S. PATENT DOCUMENTS

| | | | | |
|---|---|---|---|---|
| 4,171,029 A | * | 10/1979 | Beale | 180/54.1 |
| 4,583,505 A | * | 4/1986 | Frank et al. | 123/198 F |
| 4,591,016 A | * | 5/1986 | Matthews | 180/165 |
| 4,625,823 A | * | 12/1986 | Frank | 180/165 |
| 4,679,646 A | * | 7/1987 | Greenwood | 180/165 |
| 6,935,987 B1 | * | 8/2005 | Booth, Jr. | 476/4 |
| 7,178,618 B2 | * | 2/2007 | Komeda et al. | 180/65.275 |
| 7,293,621 B2 | * | 11/2007 | Long | 180/165 |
| 7,416,039 B1 | * | 8/2008 | Anderson et al. | 180/165 |

* cited by examiner

*Primary Examiner*—Christopher P Ellis
*Assistant Examiner*—Brian Swenson
(74) *Attorney, Agent, or Firm*—Ladas & Parry LLP

(57) ABSTRACT

An automotive vehicle includes a vehicle body, a power transmission system, an energy storage device, a continuously variable transmission, and an electronic control device. The power transmission system includes a power source for driving the automotive vehicle. The energy storage device includes a flywheel. The continuously variable transmission interconnects the power transmission system and the energy storage device. When the automotive vehicle decelerates, the electronic control device connects the flywheel to the power transmission system through the continuously variable transmission, and transfers energy of the power transmission system to the flywheel. When the automotive vehicle accelerates and the electronic control device connects the flywheel to the power transmission system through the continuously variable transmission, energy of the flywheel is transferred to the power transmission system.

33 Claims, 13 Drawing Sheets

AUTOMOTIVE VEHICLE EMPLOYING KINETIC ENERGY STORAGE/REUSE CAPABILITY

BACKGROUND OF THE INVENTION

1. Field of the Invention

The invention relates to an automotive vehicle, more particularly to an automotive vehicle having a flywheel energy storage device.

2. Description of the Related Art

Referring to FIG. 1, a conventional hybrid automobile utilizes gasoline and batteries as power source, and employs a control unit to control an electronic control switching clutch so as to switch power to be outputted from either an engine or a motor/generator, thereby achieving the purpose of selecting different power sources in accordance with different needs. For instance, when an automobile is driven at a low speed, the motor/generator is first used as the power source, and when later a high speed is desired, the engine is chosen as the power source. Hence, in this manner, fuel economy is achieved. With respect to restocking battery power, kinetic energy is converted through the motor/generator into stored electrical energy during braking for output during subsequent starting or low-speed driving of the automobile.

Though the conventional hybrid automobile achieves the purpose of saving energy, especially when the vehicle is started or during low-speed driving, there are still many drawbacks associated with the conventional hybrid automobile. The following is a list of some of the drawbacks which have resulted in minimal motivation for the wide use of the conventional hybrid automobile:

1. The cost of the motor/generator is rather high, which results in high overall price for the automobiles. Hence the purpose of saving money for customers is questionable.

2. The present technology is such that efficiency in converting kinetic energy through the motor/generator into electric energy in the batteries is low. Moreover, even when the automobile is idle, electric energy stored in the batteries discharging due to the natural characteristics of batteries, and hence stored electrical energy targeted for reuse is gradually dissipated.

3. High-powered batteries are preferred for use in the conventional hybrid automobile. However, such batteries not only have short service lives and require frequent replacement, but also require high cost outlays for each replacement. Furthermore, the disposal of the batteries is also a cause of much concerned as they may contribute to environmental pollution if not disposed of properly.

4. Since the motor/generator and batteries occupy a significant space, the overall automobile size is correspondingly increased, which not only runs counter the efforts at manufacturing small-sized automobiles, but also, due to the corresponding increases in the body weight of the automobile, an engine with a larger displacement is required for providing sufficient driving power. A larger engine, in turn, further increases manufacturing cost.

As such, it is highly desired to overcome the aforesaid drawbacks of the conventional hybrid automobiles so as to reduce manufacturing cost and hence the selling price thereof.

SUMMARY OF THE INVENTION

Therefore, the main object of the present invention is to provide an automotive vehicle that may be manufactured at a low cost and that has a high kinetic energy-converting efficiency and a low overall weight.

According to one aspect of the present invention, there is provided an automotive vehicle. The automotive vehicle comprises a vehicle body, a power transmission system, an energy storage device, a continuously variable transmission and an electronic control device.

The vehicle body includes a wheel unit.

The power transmission system is mounted in the vehicle body, connected to the wheel unit, and includes a power source for driving the wheel unit.

The energy storage device is mounted in the vehicle body and includes a flywheel.

The continuously variable transmission is mounted in the vehicle body and interconnects the power transmission system and the energy storage device.

The electronic control device is connected among the power transmission system, the energy storage device, and the continuously variable transmission.

When the automotive vehicle decelerates, the electronic control device connects the flywheel to the power transmission system through the continuously variable transmission so as to allow conversion of the kinetic energy of the power transmission system into stored rotational energy of the flywheel.

When the automotive vehicle accelerates and when the electronic control device is operated to connect the flywheel to the power transmission system through the continuously variable transmission, the stored rotational energy of the flywheel is converted into the kinetic energy of the power transmission system for driving the wheel unit.

When the automotive vehicle accelerates and when the electronic control device is operated to disconnect the flywheel from the power transmission system through the continuously variable transmission, only the power source of the power transmission system drives the wheel unit.

According to another aspect of the present invention, there is provided an automotive vehicle. The automotive vehicle comprises a vehicle body, a wheel unit, a power transmission system, an energy storage device, a continuously variable transmission, and an electronic control device.

The wheel unit is mounted on the vehicle body.

The power transmission system is mounted in the vehicle body, and includes an axle unit linked to the wheel unit, a first electronic control clutch connected to the first axle unit, a power source, and a second electronic control clutch connected to the power source.

The energy storage device is mounted in the vehicle body, connected to the second electronic control clutch, and includes a flywheel.

The continuously variable transmission is mounted in the vehicle body and interconnects the first electronic control clutch of the power transmission system and the energy storage device.

The electronic control device is connected among the power transmission system, the energy storage device, and the continuously variable transmission.

When the automotive vehicle decelerates, the electronic control device connects the flywheel and the axle unit through the continuously variable transmission and the first electronic control clutch for converting the kinetic energy of the power transmission system into stored rotational energy of the flywheel.

When the automotive vehicle accelerates, the electronic control device connects the flywheel to the axle unit through the continuously variable transmission and the first electronic control clutch so that rotational energy of the flywheel is converted into kinetic energy of the power transmission system for driving the wheel unit.

The electronic control device is operable to transmit the kinetic energy of the power source to the flywheel through the second electronic control clutch.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
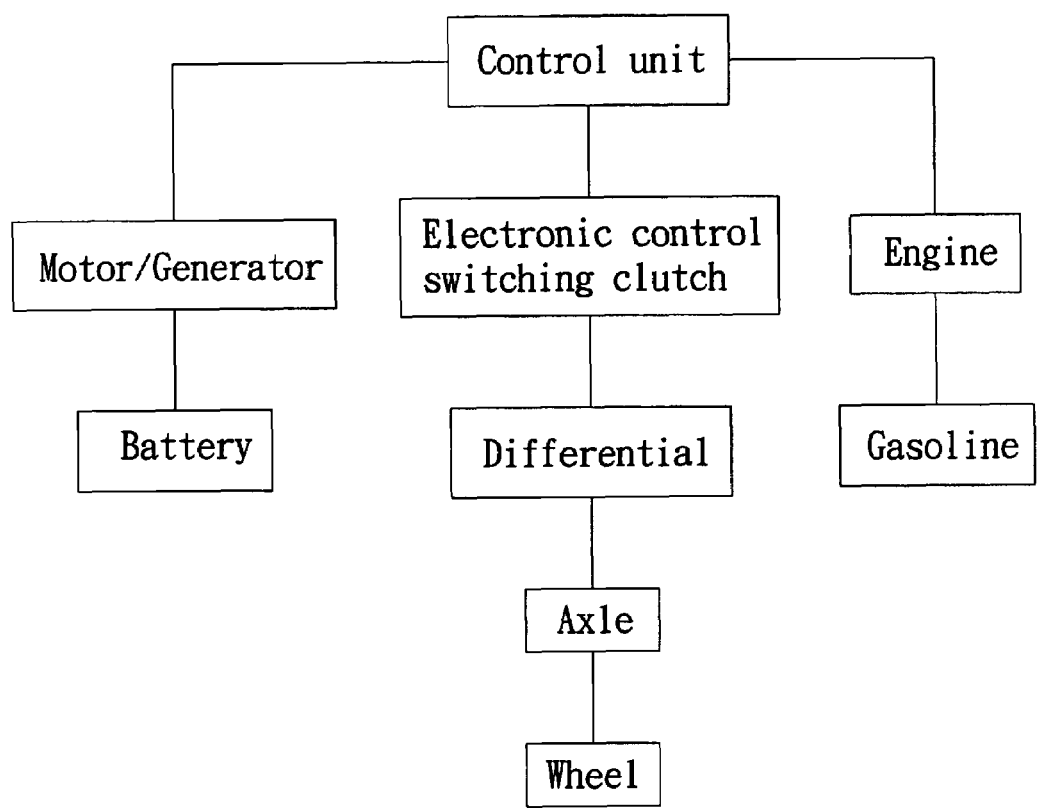
FIG. 1 is a schematic block diagram of a conventional hybrid automobile.
Figure 2:
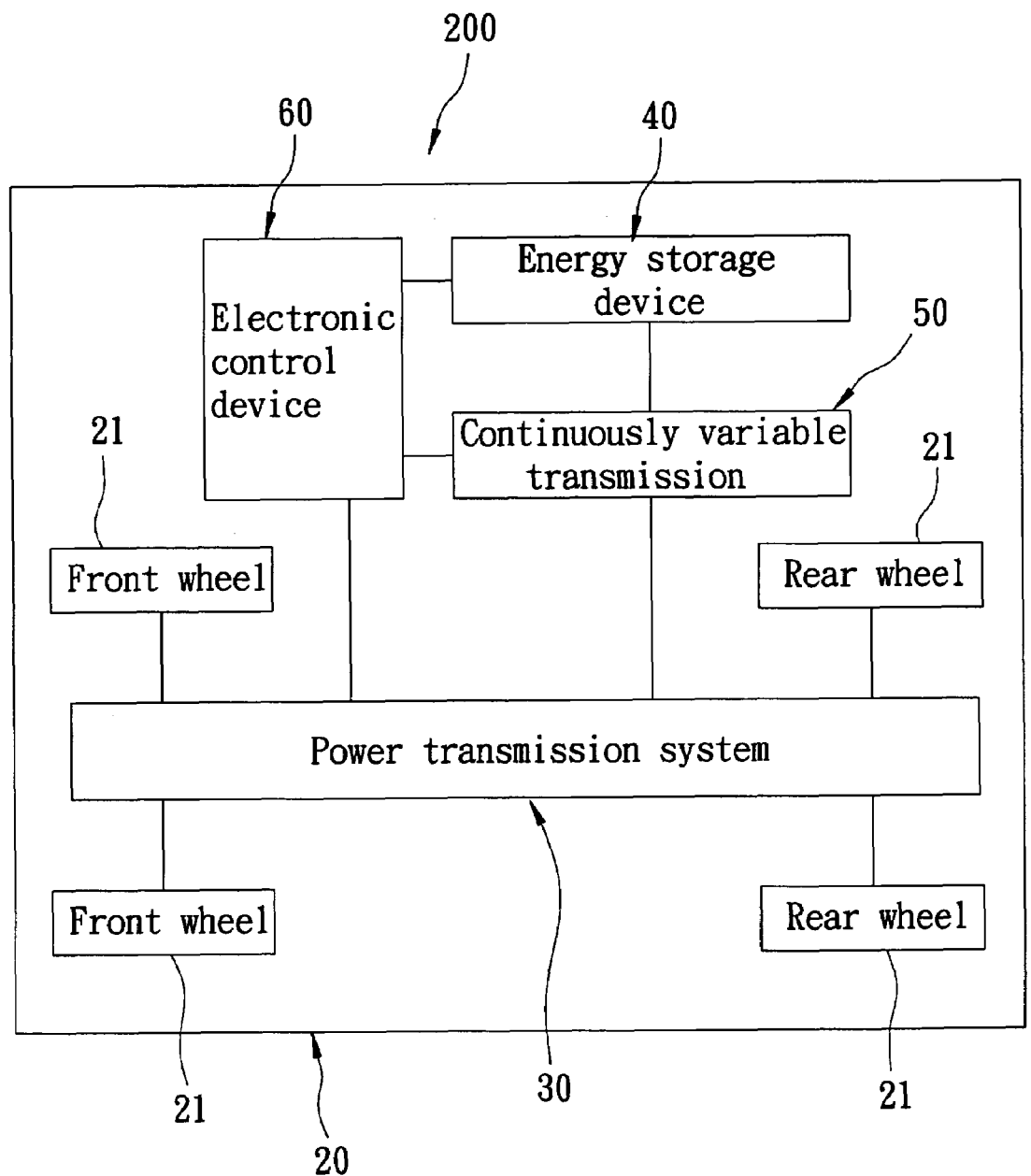
FIG. 2 is a schematic block diagram of the first preferred embodiment of an automotive vehicle that has a flywheel energy storage device according to the present invention.
Figure 3:
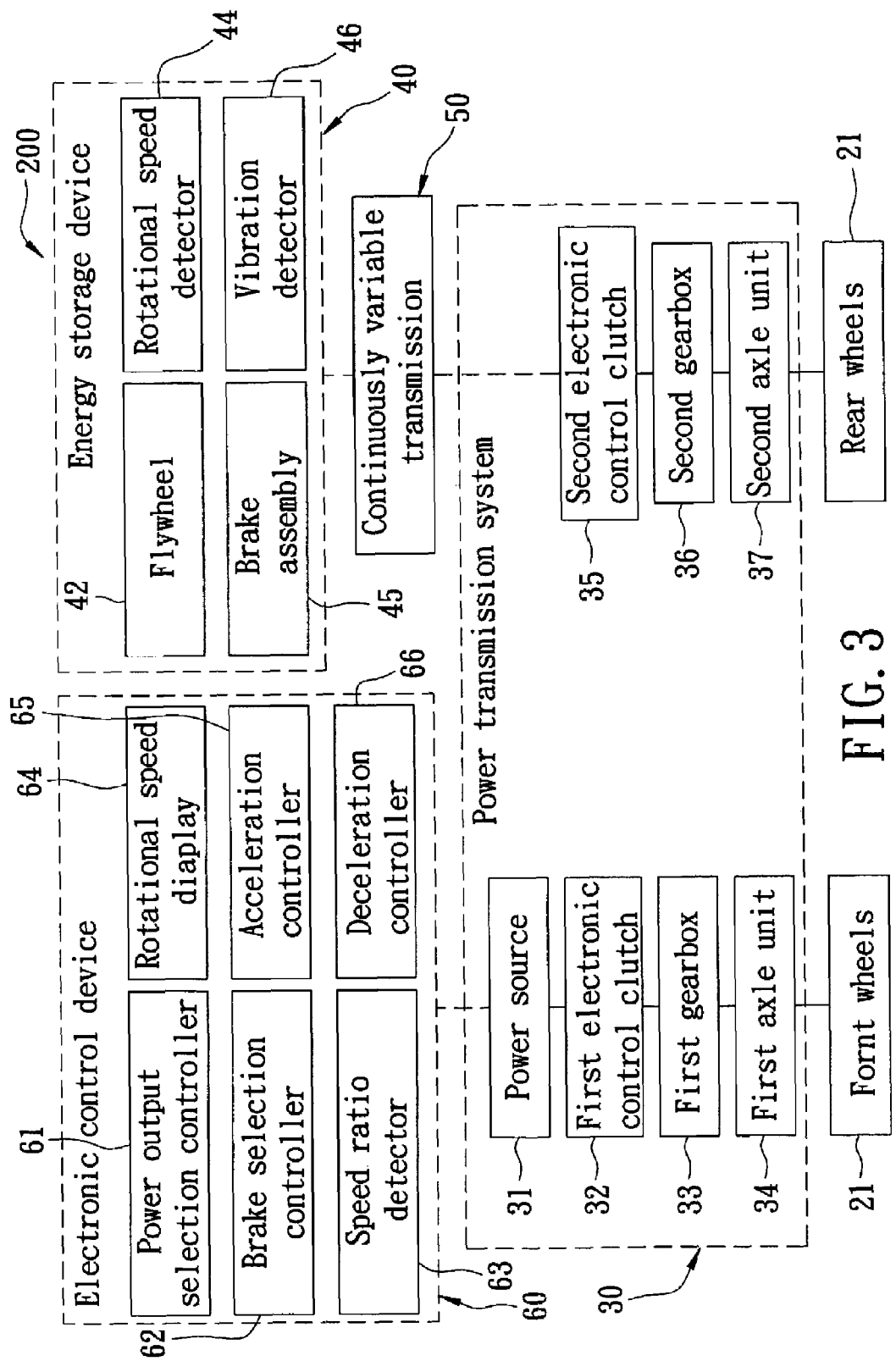
FIG. 3 is a schematic block diagram of the first preferred embodiment, illustrating in great detail a power transmission system, an energy storage device, a continuously variable transmission and an electronic control device.
Figure 4:
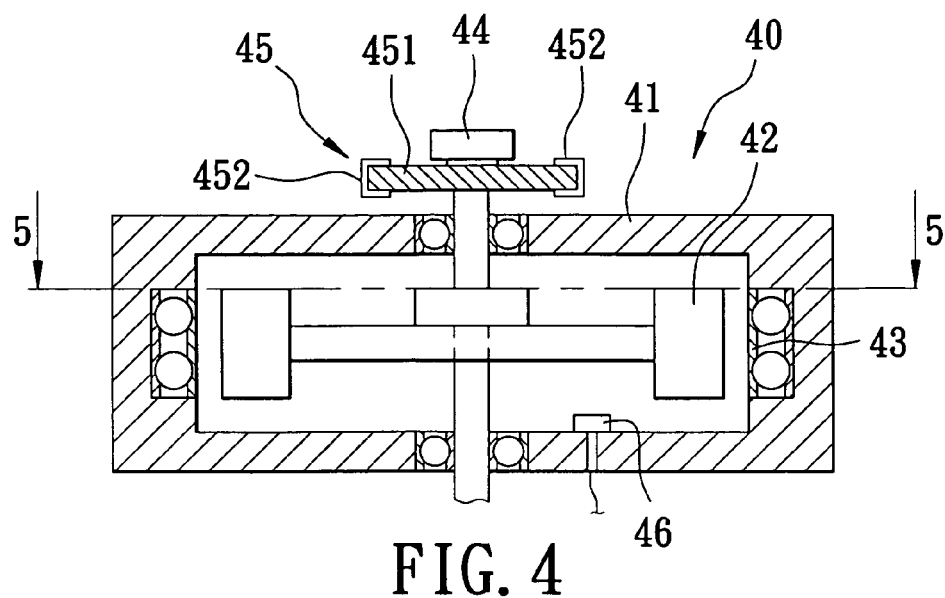
FIG. 4 is a schematic sectional view of the first preferred embodiment, illustrating the energy storage device.
Figure 5:
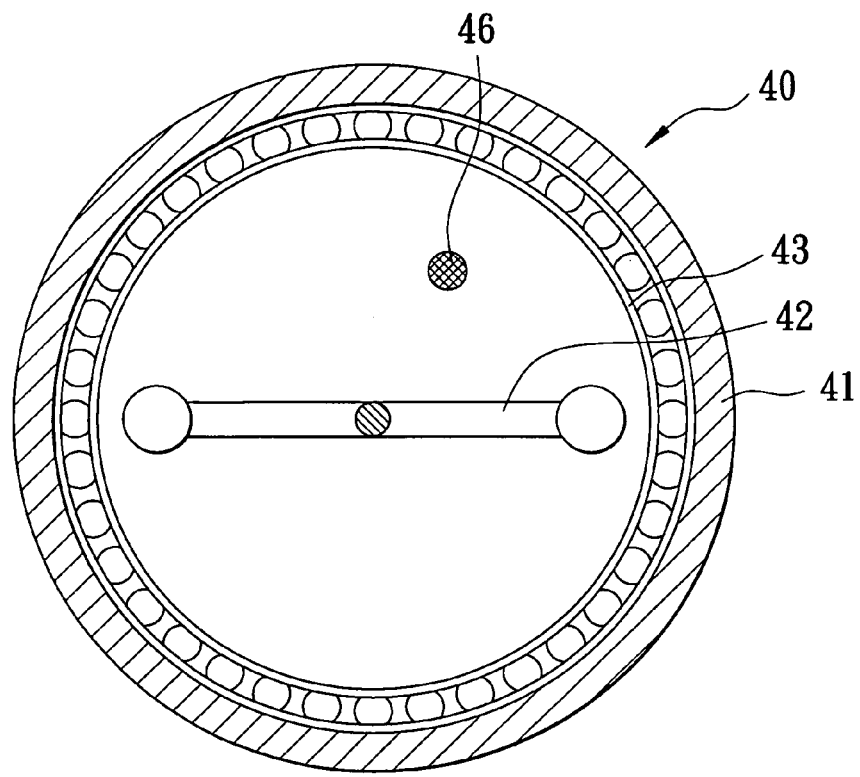
FIG. 5 is a sectional view taken along line 5-5 of FIG. 4.

Referring to FIGS. 2 and 3, the first preferred embodiment of an automotive vehicle 200 according to the present invention is shown to include a vehicle body 20, a power transmission system 30, an energy storage device 40, a continuously variable transmission 50, and an electronic control device 60.

The vehicle body 20 includes a wheel unit.

The power transmission system 30 is mounted in the vehicle body 20, connected to the wheel unit, and includes a power source 31 for driving the wheel unit, a first electronic control clutch 32 connected to the power source 31, a first gearbox 33 connected to the first electronic control clutch 32, a first axle unit 34 connected to the first gearbox 33, a second electronic control clutch 35 connected to the continuously variable transmission 50, a second gearbox 36 connected to the second electronic control clutch 35, and a second axle unit 37 connected to the second gearbox 36.

The power source 31 may be an engine or a motor incorporated with a battery system.

Since the first and second electronic control clutches 32, 35 and the first and second gear boxes 33, 36 are vehicle components well known in the art, no further details are given herein for the sake of brevity.

The wheel unit includes: a pair of front wheels 21 linked to the first axle unit 34, and a pair of rear wheels 21 linked to the second axle unit 37. Each of the first and second axle units 34, 37 consists of a differential (not shown) and a wheel axle (not shown), and since these are vehicle components well known in the art, no further details are given herein for the sake of brevity.

Referring additionally to FIGS. 2, 3, 4 and 5, the energy storage device 40 is mounted in the vehicle body 20 and includes a flywheel 42, a housing 41 for accommodation of the flywheel 42, a movable ring 43 that is mounted rotatably in the housing 41, that surrounds and is spaced apart from the flywheel 42, and that is coaxial with and adjacent to the flywheel 42, a rotational speed detector 44 for detecting the rotational speed of the flywheel 42, a brake assembly 45 operable to apply a braking force to the flywheel 42, and an abnormal vibration detector 46 for detecting abnormal vibration of the flywheel 42.

The housing 41 is made from a sound-proof material, and is filled with a gas having a density less than that of air, such as helium, in order to reduce air resistance against rotation of the flywheel 42.

The flywheel 42 is rotatable for storing and releasing kinetic energy.

The movable ring 43 is spaced apart from the flywheel 42 by a very short distance, and is a ball bearing in this embodiment. If the flywheel 42 malfunctions while rotating and is displaced, it will collide with the housing 41 during rotation thereof. Hence the movable ring 43 rotates with the housing 41 and the flywheel 42 so as to slow down rotation thereof.

The rotational speed detector 44 is connected to the electronic control device 60 such that the continuously variable transmission 50 is disconnected from the power transmission system 30 under control of the electronic control device 60 when a brake is applied and when the rotational speed of the flywheel 42 reaches a threshold value.

The brake assembly 45 is connected to the flywheel 42 and includes a brake disc 451 co-rotatable with the flywheel 42 and a plurality of brake linings 452.

The abnormal vibration detector 46 in this embodiment is a capacitor-type microphone mounted in the housing 41 and is connected to the electronic control device 60 for sending abnormal vibration signals thereto. When the flywheel 42 malfunctions during rotation, an abnormal vibration thereof normally occurs prior to collision with the moving ring 43, thereby resulting in an abnormal sound. The abnormal sound is picked up by the microphone of the vibration detector 46, which then outputs abnormal vibration signals. Upon receiving the abnormal vibration signals, the electronic control clutch 60 is configured either to discontinue further increase in the rotational speed of the flywheel 42 or to slow down the rotational speed of the flywheel 42 through control of the brake assembly 45. Moreover, when the automotive vehicle 200 is involved in a car accident or the like, the brake assembly 45 automatically stops the flywheel 42.

The continuously variable transmission 50 is mounted in the vehicle body 20 and interconnects the second electronic control clutch 35 of the power transmission system 30 and the flywheel 42 of the energy storage device 40. Since the structure and operation of the continuously variable transmission 50 are well known in the art, no further details are given herein for the sake of brevity.

The electronic control device 60 is connected among the power transmission system 30, the energy storage device 40, and the continuously variable transmission 50 for monitoring and cooperating therewith (for instance, constantly checking and, if needed, processing states of the power source 31, the first and second electronic control clutches 32, 35, the first and second axle units 34, 37, and the operation and rotational speed of the flywheel 42) so as to enable storage and reuse of kinetic energy of the power transmission system 30.

Figure 6:
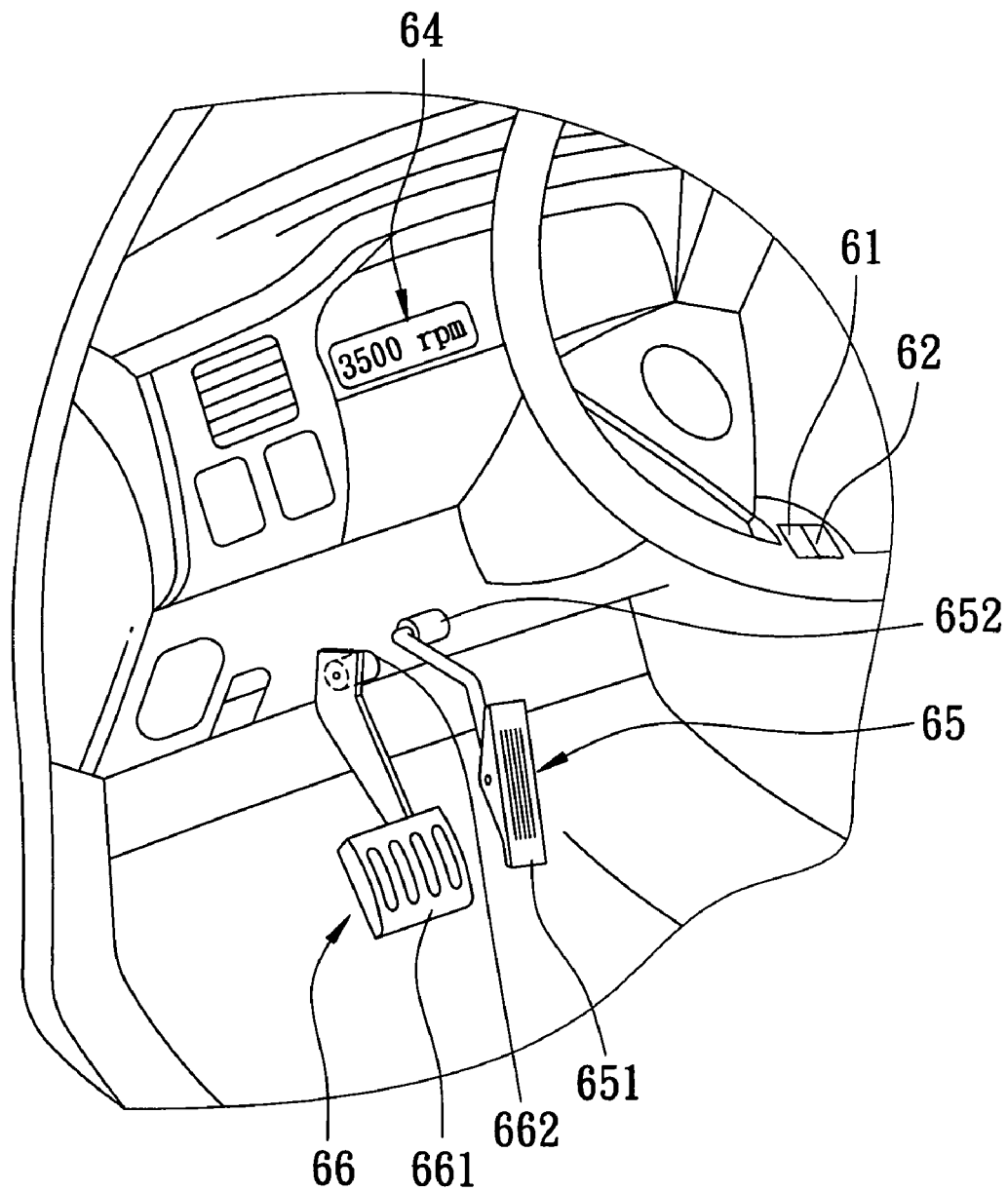
FIG. 6 is a fragmentary perspective view of the first preferred embodiment, illustrating an accelerator controller and a decelerator controller of the electronic control device.
Figure 7:
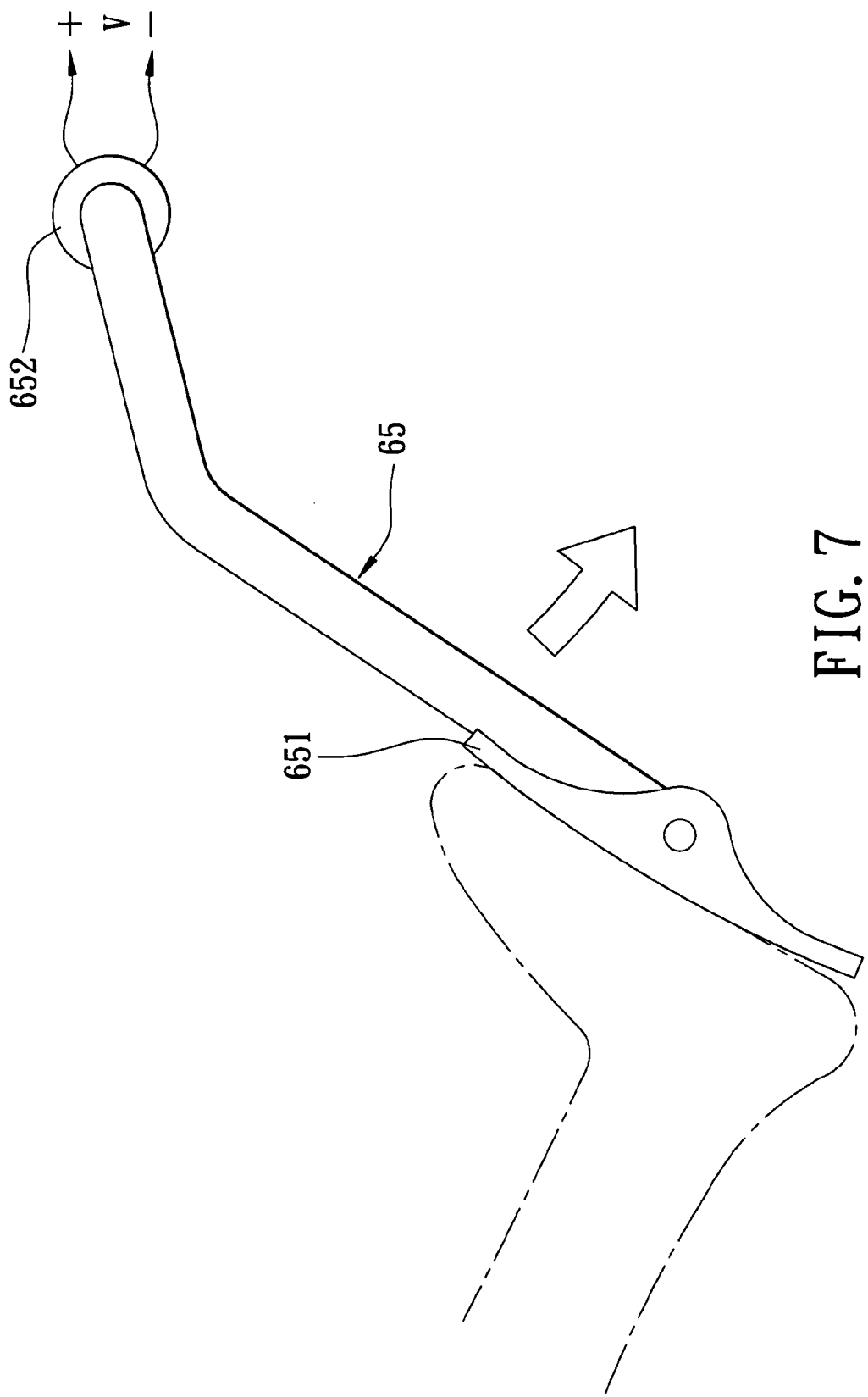
FIG. 7 is a schematic view of the first preferred embodiment, illustrating the accelerator controller in a state of use.

Referring additionally to FIGS. 6 and 7, the electronic control device 60 includes a power output selection controller 61 for selecting power output from one of the power source 31 and the energy storage device 40, a brake selection controller 62 connected to the energy storage device 40 and operable to retard a rotational speed of the wheel unit by means of the energy storage device 40, a speed ratio detector 63 connected to the continuously variable transmission 50, a rotational speed display 64 mounted on the vehicle body 20 and connected to the rotational speed detector 44 of the energy storage device 40 for displaying the rotational speed of the flywheel 42, an acceleration controller 65 for acceleration control, and a deceleration controller 66 for deceleration control.

Through cooperation with detection of rotational speeds of the first and second axle units 34, 37, the speed ratio detector 63 is used to adjust a speed ratio of the continuously variable transmission 50 such that a rotational speed outputted by the continuously variable transmission 50 matches with those of the first and second axle units 34, 37. Therefore, when the second electronic control clutch 35 is operated, there will be no speed difference among the continuously variable transmission 50 and the first and second axle units 34, 37 so as to avoid damage to the components thereof and speed change that is not smooth.

The acceleration controller 65 has an accelerator pedal 651, and a first variable resistor 652 connected to the accelerator pedal 651 and configured to generate a first variable resistance in accordance with a pressure exerted on the accelerator pedal 651 to thereby result in a first variable voltage across the first variable resistor 652. The electronic control device 60 determines a drive speed of the wheel unit according to a change in the first variable resistance.

When the accelerator pedal 651 is abruptly depressed to thereby result in a dramatic change in the first variable voltage and when the flywheel 42 accumulates sufficient stored rotation energy to drive the wheel unit through the continuously variable transmission 50, the electronic control device 60 automatically controls the first electronic control clutch 32 to disconnect the power source 31 from the first gearbox 33, and controls the second electronic control clutch 35 to connect the flywheel 42 to the second gearbox 36 and the second axle unit 37 of the power transmission system 30 through the continuously variable transmission 50 for outputting energy from the flywheel 42 to drive the front and rear wheels 21. As a result, an instant acceleration effect is achieved through the kinetic energy released from the flywheel 42. On the other hand, the power output selection controller 61 is also operable at anytime for manual selection of the kinetic energy outputted from the flywheel 42 as the source of power, which results in an instant acceleration effect as well. When the flywheel 42 releases kinetic energy, the speed ratio detector 63 detects a speed ratio between the flywheel 42 and the front and rear wheels 21 as a reference for determining the rate at which the kinetic energy is released.

On the other hand, when the accelerator pedal 651 is gently depressed to thereby result in a smooth change in the first variable voltage, it is also feasible to manually select kinetic energy to be outputted from the housing 41 as long as the speed ratio of the continuously variable transmission 50 is gently adjusted such that the automotive vehicle 200 is accelerated slowly. In this sense, whether fast acceleration or slow acceleration is desired, as long as the flywheel 42 accumulates sufficient stored rotation energy, the kinetic energy thereof is available for the automotive vehicle 200 to use in vehicle starting and driving. In addition, through the kinetic energy release of the flywheel 42, even a small-sized car can be provided with superior acceleration capability, as well as a reduction in fuel consumption during vehicle acceleration. Of course, a driver is provided with an option of selecting the power source 31 (the engine or the motor) for an acceleration task by designating the electronic control device 60 to control the second electronic control clutch 35 to disconnect the continuously variable transmission 50 from the power transmission system 30 such that only the power source 31 drives the automotive vehicle 200.

The deceleration controller 66 has a decelerator pedal 661, and a second variable resistor 662 connected to the decelerator pedal 661 and configured to generate a second variable resistance in accordance with a pressure exerted on the decelerator pedal 661 to thereby result in a second variable voltage across the second variable resistor 662. The electronic control device 60 determines a speed of the wheel unit according to a change in the second variable resistance.

When the decelerator pedal 661 is abruptly depressed (e.g., during emergency braking) to thereby result in a dramatic change in the second variable voltage and before the flywheel 42 accumulates sufficient stored rotation energy to drive the wheel unit through the continuously variable transmission 50, the electronic control device 60 automatically controls the second electronic control clutch 35 to interconnect the flywheel 42 and the power transmission system 30 through the continuously variable transmission 50 so that kinetic energy from the wheel unit is rapidly converted into stored rotational energy of the flywheel 42 through the second axle unit 37 and the second gearbox 36. At he same time, the rotational speed of the wheel unit is quickly reduced so as to achieve a desired effect of emergency braking. When the decelerator pedal 661 is abruptly depressed and when the flywheel 42 accumulates sufficient stored rotation energy, the electronic control device 60 controls the second electronic control clutch 35 to disconnect the continuously variable transmission 50 from the power transmission system 30 so that only the inherent braking system of the automotive vehicle 200 is used to complete the braking task.

On the other hand, when the decelerator pedal 661 is gently depressed to thereby result in a smooth change in the second variable voltage, it is also feasible to use the brake selection controller 62 to manually select the flywheel 42 for the braking task (during which the speed ratio of the continuously variable transmission 50 will be slowly adjusted), or the inherent braking system of the automotive vehicle 200 for completing the braking task.

Therefore, when deceleration is desired, the energy storage device 40 is available for both emergency braking and slow braking, and for transmitting kinetic energy generated by the wheel unit to the energy storage device 40 for later reuse. Moreover, when acceleration is desired, the energy storage device 40 is available for cooperation with the continuously variable transmission 50 for both fast and slow acceleration. Through direct rotational energy transmission between the flywheel 42 and the wheel unit, kinetic energy of the power transmission system 30 is more efficiently stored and reused. In comparison with the conventional energy reuse system that requires storage batteries for kinetic/electric energy conversion, this invention significantly increases energy storage/reuse efficiency, and furthermore, and avoids the high cost, large size, and expensive maintenance associated with the conventional power system consisting of motors/generators and batteries.

Figure 8:
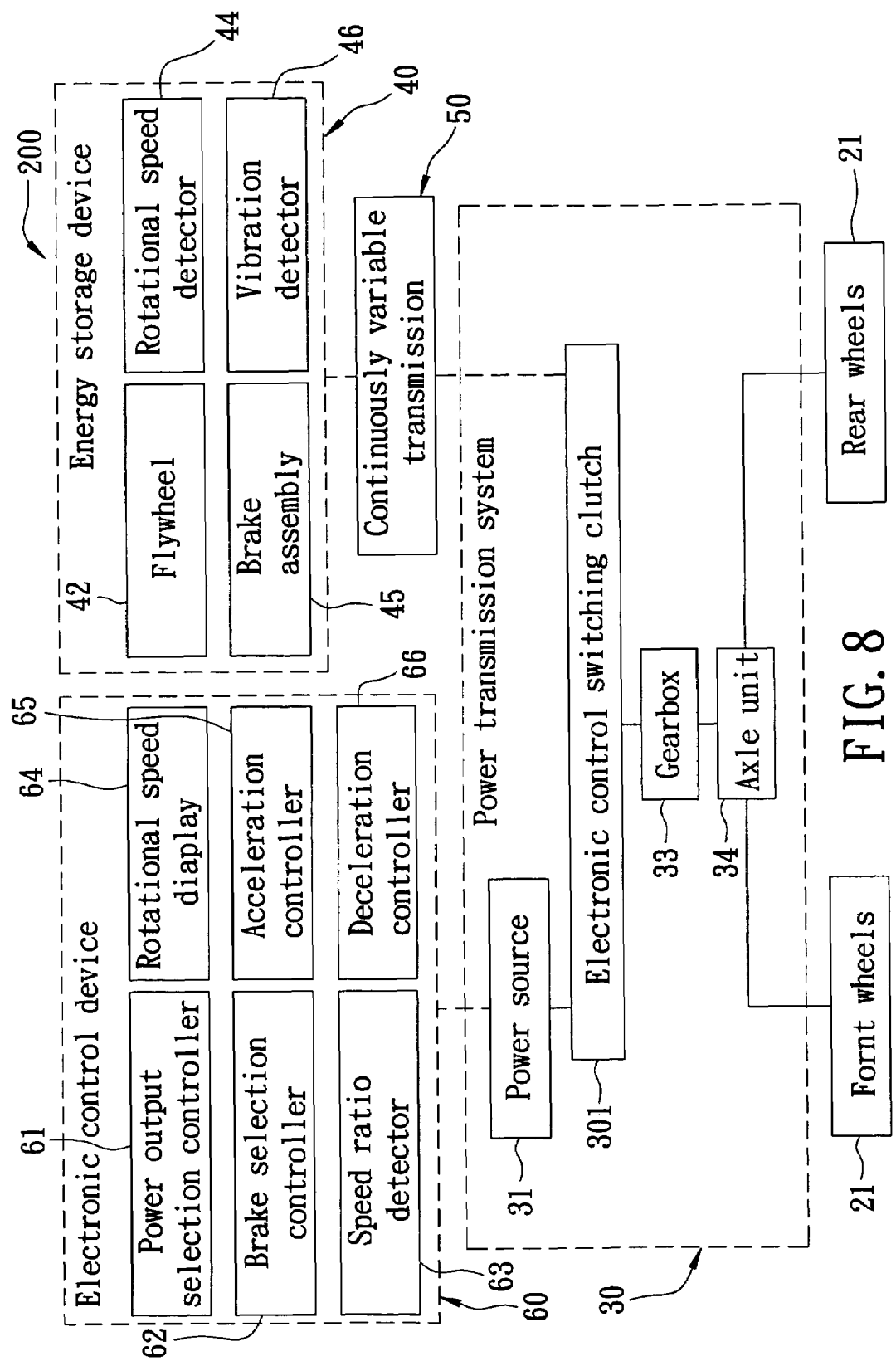
FIG. 8 is a schematic block diagram of the second preferred embodiment of an automotive vehicle according to the present invention.

As shown in FIGS. 2 and 8, the second preferred embodiment of this invention is similar to the first preferred embodiment, except that: the power transmission system 30 includes a power source 31, an electronic control switching clutch 301 interconnecting the power source 31 and the continuously variable transmission 50, a gearbox 33 connected to the electronic control switching clutch 301, and a axle unit 34 connected to the gearbox 33. The wheel unit is linked to the axle unit 34. The axle unit 34 may also be designed to be linked to only one of the front wheel pair and the rear wheel pair so as that the automotive vehicle 200 forms a front or rear wheel-driven vehicle.

Therefore, when deceleration is desired, the electronic control device 60 controls the electronic control switching clutch 301 to be disconnected from the power source 31 and connected to the continuously variable transmission 50 so as to transmit the kinetic energy of the wheel unit to the energy storage device 40 for energy storage. On the other hand, when acceleration is desired, the electronic control device 60 controls the electronic control switching clutch 301 to be disconnected from the power source 31 and connected to the continuously variable transmission 50 so as to transfer the kinetic energy from the energy storage device 40 to the wheel unit for releasing energy to meet acceleration needs. When the flywheel 42 does not have sufficient stored rotation energy to drive the wheel unit through the continuously variable transmission 50, the electronic control device 60 controls the electronic control switching clutch 301 to interconnect the continuously variable transmission 50 and the power source 31 so as to maintain speed of the automotive vehicle 200. Since the flywheel 42 does not store a sufficient rotational energy at this time, the potential for storable kinetic energy increases. The next time the automotive vehicle 200 decelerates, kinetic energy is fully available for being stored in the energy storage device 40, and at the same time, for use in emergency braking (in this state, cooperation with the brake selection controller 62 is needed). Of course, the driver may operate the power selection controller 61 to select the power source 31 (the engines or the motor) for acceleration and, in this manner, utilize the energy storage device 40 as a spare kinetic energy source. Subsequently, when instant acceleration is desired, the energy storage device 40 is selected for outputting kinetic energy to quickly accelerate the automotive vehicle 200.

Figure 9:
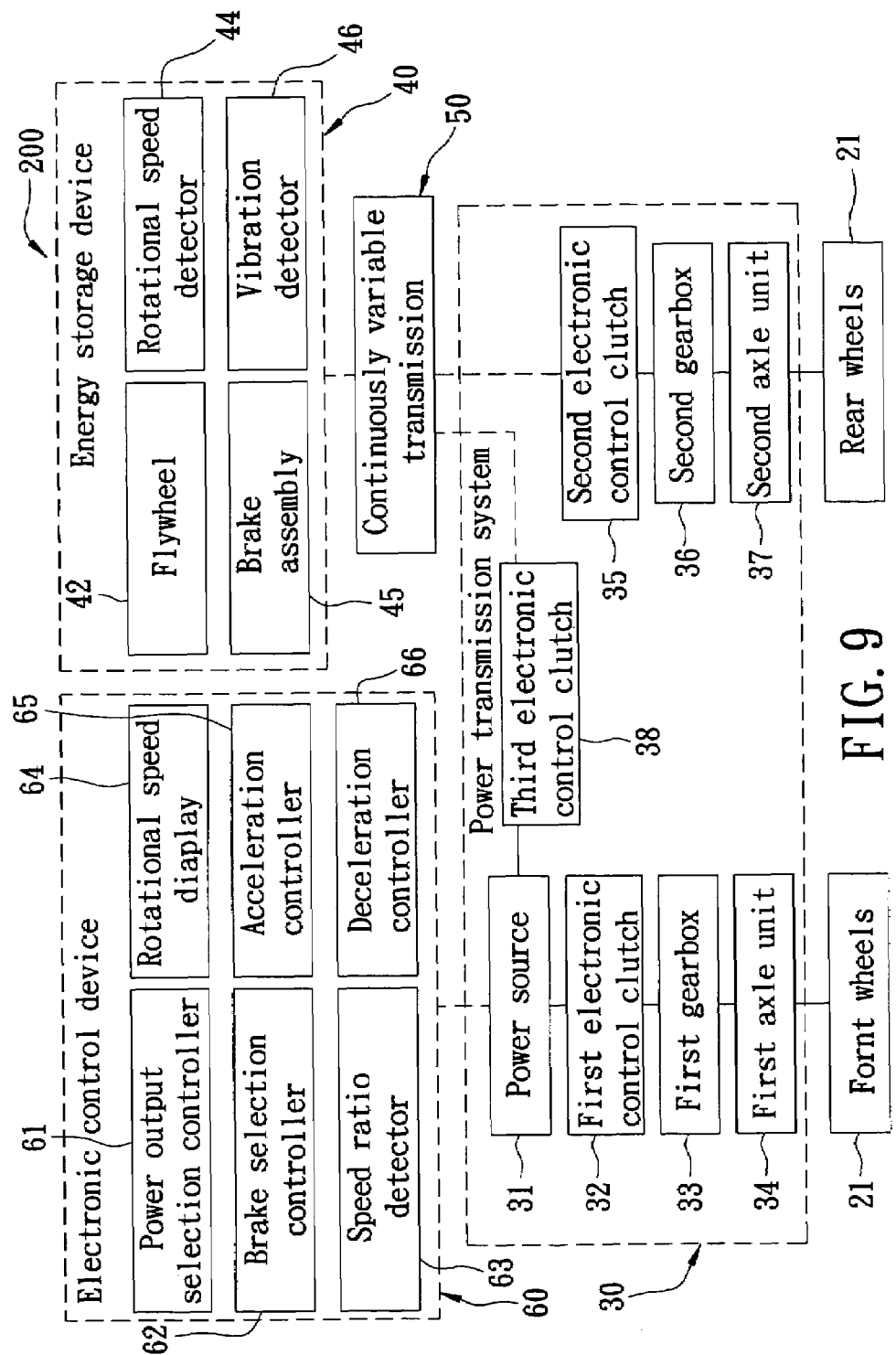
FIG. 9 is a schematic block diagram of the third preferred embodiment of an automotive vehicle according to the present invention.

As shown in FIGS. 2 and 9, the third preferred embodiment of this invention is similar to the preferred embodiment, except that: the power transmission system 30 further includes a third electronic control clutch 38 interconnecting the power source 31 and the continuously variable transmission 50.

As such, since kinetic energy stored in the energy storage device 40 decreases with the passage of time, if sufficient kinetic energy in the energy storage device 40 is desired to be maintained to at least a certain level sufficient for provision during instant acceleration without using the power source 31, the third electronic control clutch 38 is operable to transfer rotation of the power source 31 to the flywheel 42 under control of the electronic control device 60 (generally speaking, the flywheel 42 has to be restocked every 2~10 minutes to maintain rotational speed no lower than 60% of the maximum rotational speed thereof). For a wheel unit driven by a general power source, such as an engine and a motor, instant acceleration consumes a large quantity of energy (i.e., fuel or electricity), and rotational speed has an inherent upper limit. In contrast, in the automotive vehicle 200, by acceleration through the flywheel 42, not only is power consumption is reduced, but also the upper limit of the rotational speed of the wheel unit is increased significantly. Hence, a small-sized car can provide for excellent acceleration typically provided for only large-sized sport cars.

Figure 10:
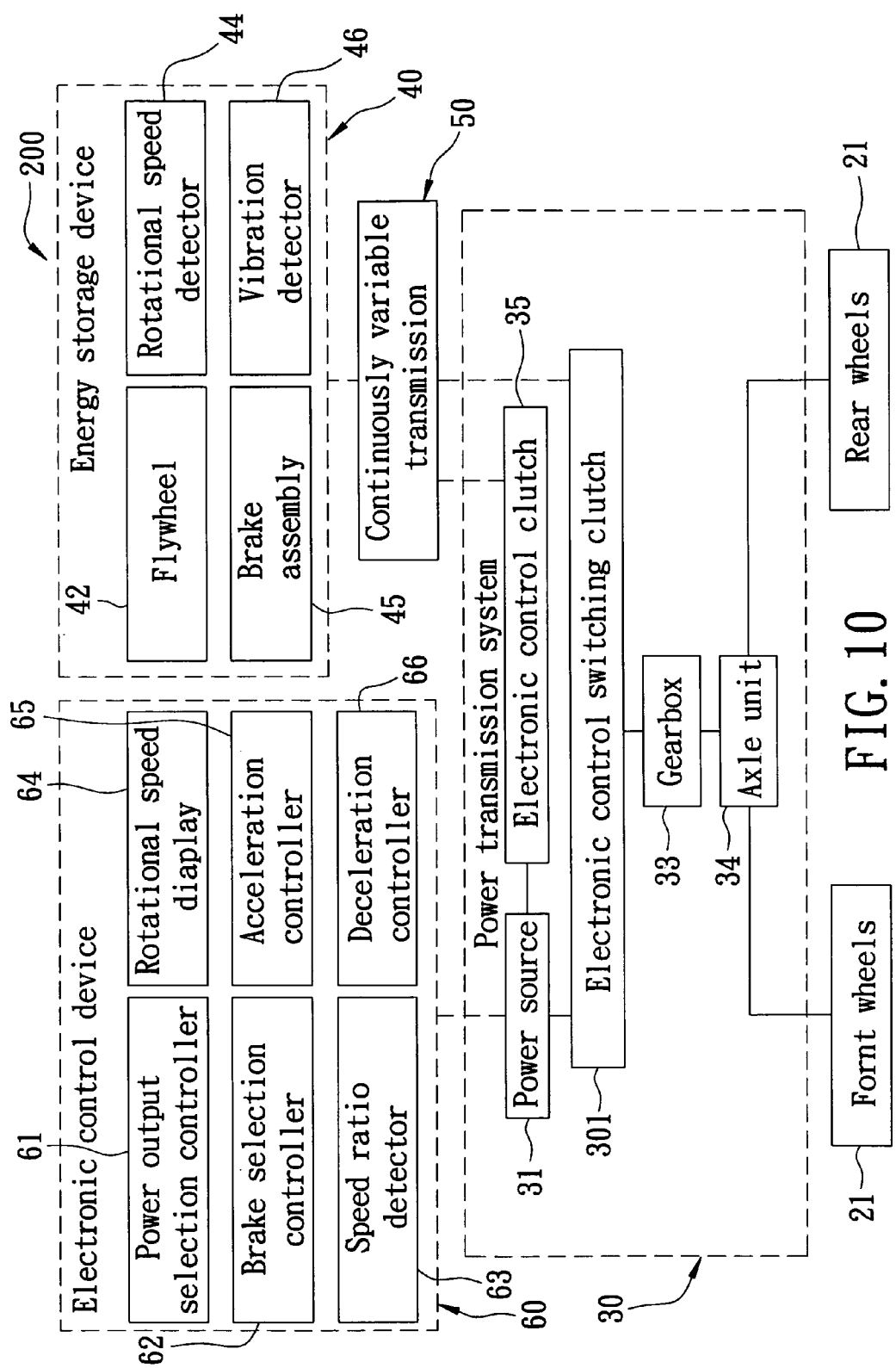
FIG. 10 is a schematic block diagram of the fourth preferred embodiment of an automotive vehicle according to the present invention.

As shown in FIGS. 2 and 10, the fourth preferred embodiment of this invention is similar to the second preferred embodiment, except that: the power transmission system 30 further includes an electronic control clutch 38 interconnecting the power source 31 and the continuously variable transmission 50. Since the functionality of the electronic control clutch 38 in this preferred embodiment is the same as that of the third electronic control clutch 38 (see FIG. 9) of the third preferred embodiment, a description thereof is omitted herein for the sake of brevity. Through use of the electronic control switching clutch 301, the power transmission system 30 is simpler in construction than in the first and third preferred embodiments, thereby greatly reducing the weight and volume of the automotive vehicle 200.

Figure 11:
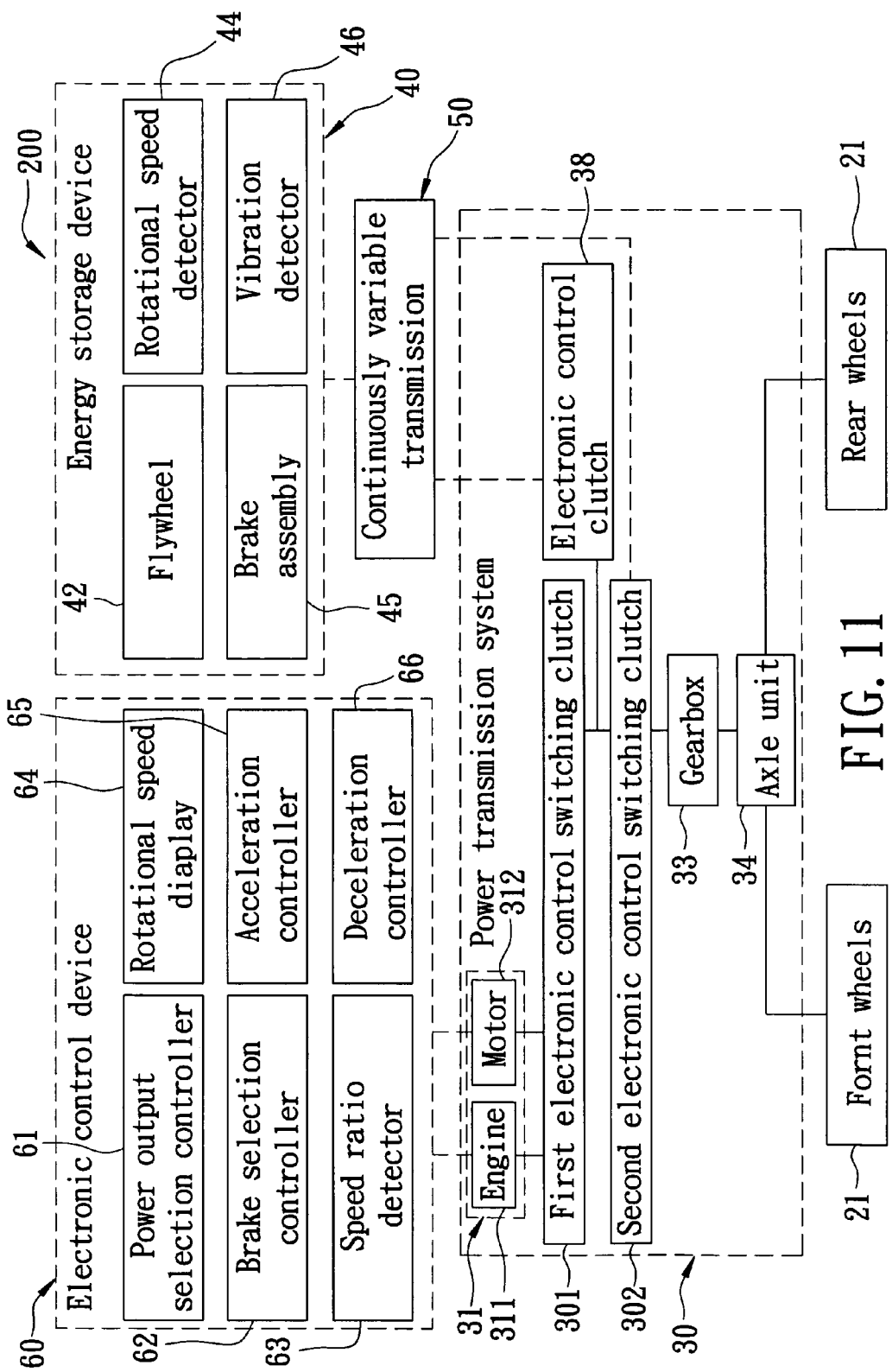
FIG. 11 is a schematic block diagram of the fifth preferred embodiment of an automotive vehicle according to the present invention.

As shown in FIGS. 2 and 11, the fifth preferred embodiment of this invention is similar to the fourth preferred embodiment, except that: the power transmission system 30 includes a power source 31 including an engine 311 and a motor 312 that are connected to the electronic control device 60, a first electronic control switching clutch 301 interconnecting the engine 311 and the motor 312, a second electronic control switching clutch 302 interconnecting the electronic control switching clutch 301 and the continuously variable transmission 50, a gearbox 33 connected to the second electronic control switching clutch 302, an axle unit 34 connected to the gearbox 33, and an electronic control clutch 38 connected among the first and second electronic control switching clutches 301, 302 and the continuously variable transmission 50.

The electronic control device 60 controls the first electronic control switching clutch 301 to select one of the engine 311 and motor 312 for primary output of power. The second electronic control switching clutch 302 is operable to select the primary power or pre-stored power (i.e., kinetic energy from the energy storage device 40). The electronic control clutch 38 is operable to allow power to be transmitted from one of the engine 311 and motor 312 to the flywheel 42 for maintaining rotational speed of the flywheel 42. Accordingly, the fifth preferred embodiment combines the advantages of both the hybrid power system and the energy storage device 40. Thus an effect of saving fuel, and reducing battery consumption and replacement compared with the conventional hybrid power system is achieved.

Figure 12:
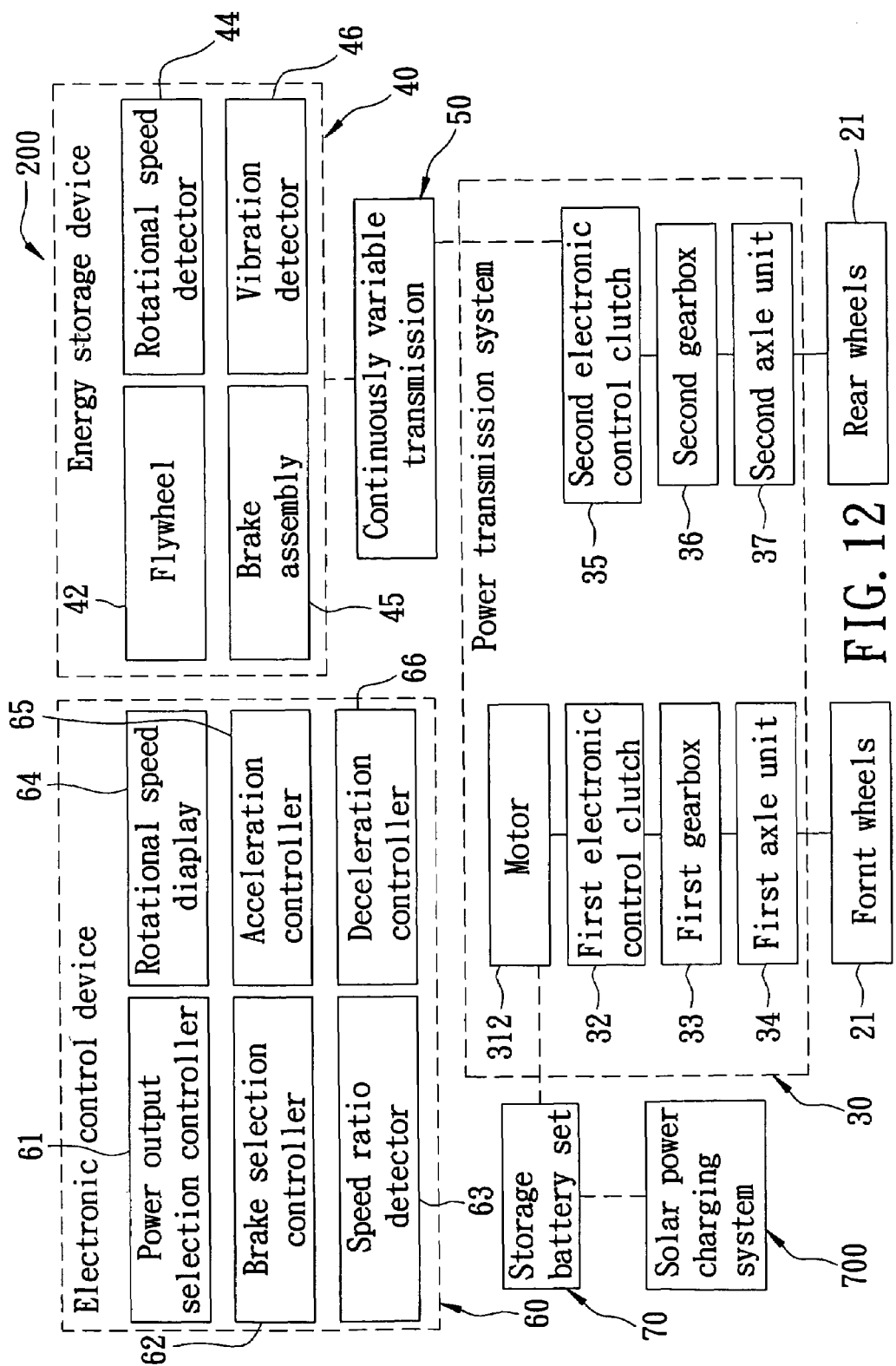
FIG. 12 is a schematic block diagram of the sixth preferred embodiment of an automotive vehicle according to the present invention.

As shown in FIGS. 2 and 12, the sixth preferred embodiment of this invention is similar to the first preferred embodiment, except that: the power source is a motor 312; and the power transmission system 30 further includes a storage battery set 70 connected electrically to the motor 312, and a solar power charging system 700 connected to the storage battery set 70. In the aforesaid embodiment, as long as a motor is used as a power source, a storage battery set is also included, which is well known in the art, and hence, further details are omitted herein for the sake of brevity.

Therefore, the sixth preferred embodiment, which is incorporated with the solar power charging system 700, saves energy, is environmentally friendly, and reduces costs. When the automotive vehicle 200 is idle and the flywheel 42 still has residual kinetic energy, the motor/generator is operable to convert the kinetic energy of the flywheel 42 into electrical energy for storage in the storage battery set 70 so as to fully recycle energy consumed.

As shown in FIGS. 2, 11, 12, the advantages of this invention are as follows:

1) In use, since the storage and release of energy between the wheel unit and the flywheel 42 is a direct rotation transfer without other forms of energy conversion (such as electric energy), there is only minimal energy loss. While a typical automotive vehicle having a 2300 cc engine and weighing 1.8 tons has a fuel economy of 5 kilometers per liter, and a typical hybrid automobile has a fuel economy of 22 kilometers per liter, this invention has a fuel economy of 45 kilometers per liter.

2) The flywheel 42 and the continuously variable transmission 50 has a total cost much lower than that of the conventional battery set and the motor/generator, and requires much less routine maintenance. Therefore, the automotive vehicle 200 of this invention is achieves a reduction in manufacturing cost compared to the conventional fuel-driven automotive vehicle, and requires less maintenance 3) The volumes and weights of the flywheel 42 and the continuously variable transmission 50 are significantly less than those of the conventional battery set and the motor/generator. Therefore, this invention reduces burden on the engine to thereby allow for the design of a small-size car. Through the storage and release of kinetic energy, about 50% of the exhaust of an ordinary engine can be reduced while, at the same time, providing for sufficient performance. Moreover, through use of the first and second electronic control switching clutches 301, 302, the volume, weight, and overall structure of the automotive vehicle 200 of this invention are further reduced.

4) Through speed change adjustment of the continuously variable transmission 50, the kinetic energy of the flywheel 42 is able to be released in an instant so as to achieve an effect of higher instant acceleration and greater torsion force than other cars of the same class. A reduction of fuel consumption during acceleration is also achieved. Moreover, in addition to storing kinetic energy through the braking process, through control of the electronic control clutch 38, the flywheel 42 is operable to store kinetic energy so as to allow for release of the stored kinetic energy for use in burst acceleration.

5) Through speed change adjustment of the continuously variable transmission 50, this invention not only achieves the effect of emergency deceleration, but also effectively stores kinetic energy generated during deceleration.

6) This invention maybe used in various energy-saving types of automotive vehicles, such as a car with a hybrid power system consisting of an engine 311 and a motor 312, a car with a solar energy charging system 700, etc.

Figure 13:
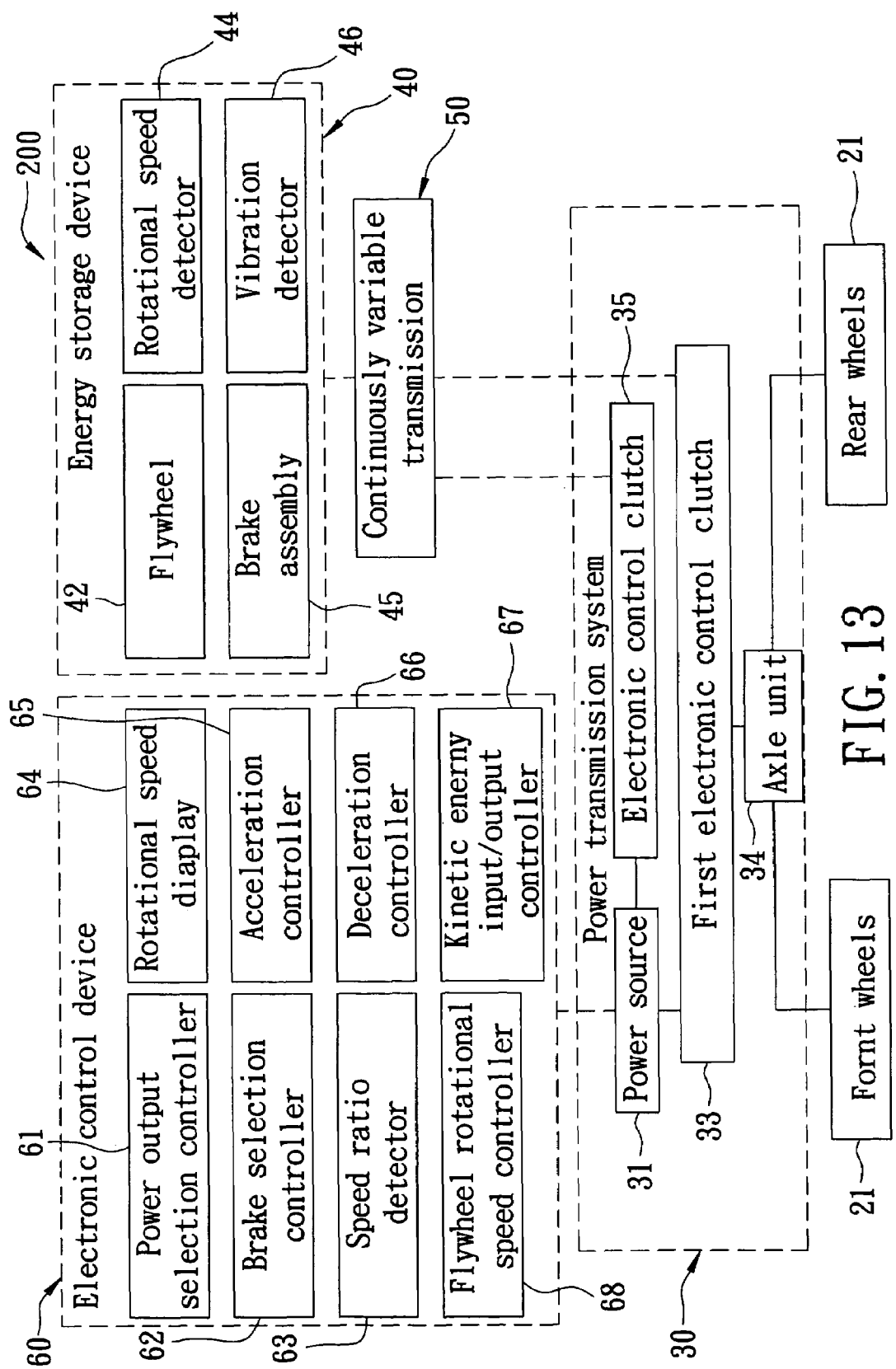
FIG. 13 is a schematic block diagram of the seventh preferred embodiment of an automotive vehicle according to the present invention.
Figure 14:
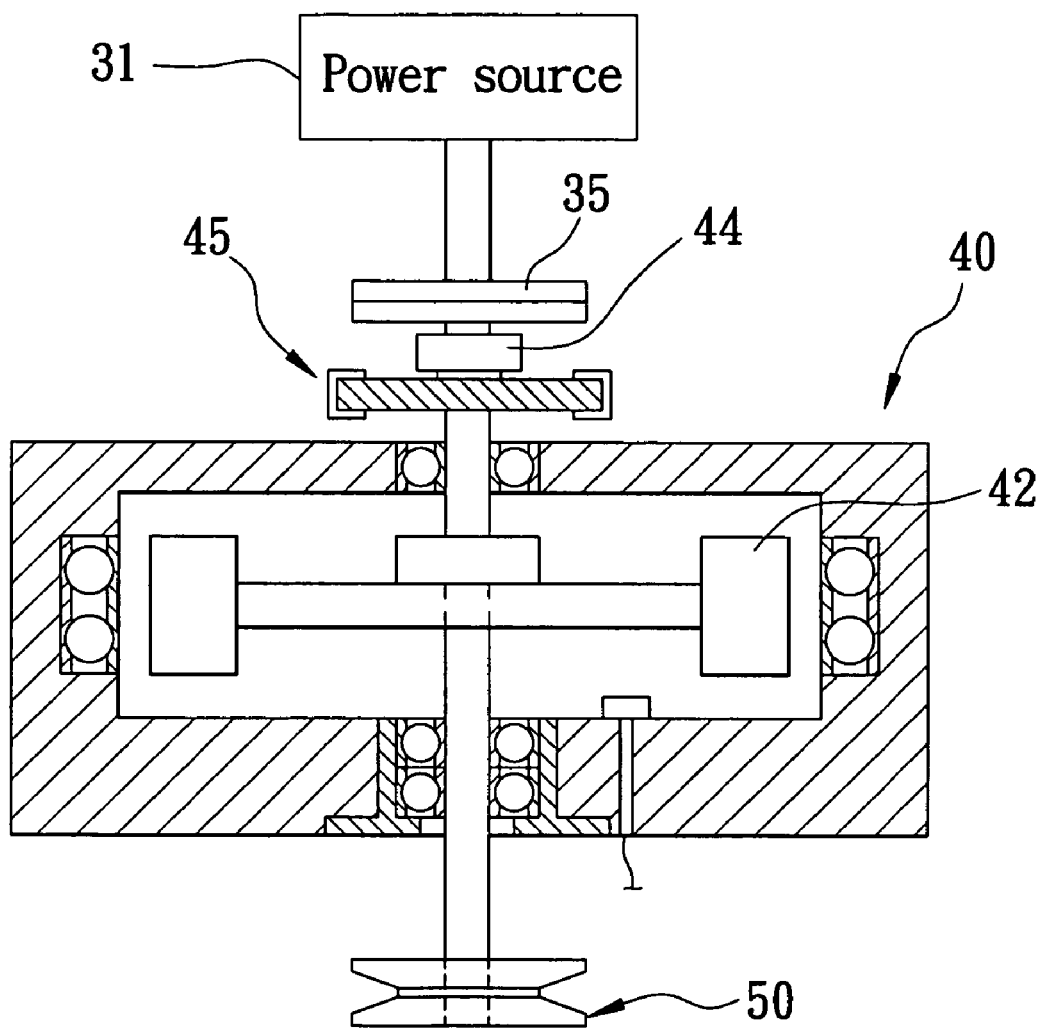
FIG. 14 is a schematic sectional view of the seventh preferred embodiment, illustrating an energy storage device.

As shown in FIGS. 13 and 14, the seventh preferred embodiment of this invention is similar to the fourth preferred embodiment, except that: the power transmission system 30 includes an axle unit 34 linked to the wheel unit, a first electronic control clutch 32 connected to the axle unit 34, a power source 31, and a second electronic control clutch 35 connected to the power source 31; the energy storage device 40 is connected to the second electronic control clutch 35, and includes a flywheel 42; the continuously variable transmission 50 is mounted in the vehicle body 20 and interconnects the first electronic control clutch 32 of the power transmission system 30 and the energy storage device 40; and the electronic control device 60 further includes a flywheel rotational speed controller 68 and a kinetic energy input/output controller 67.

In this embodiment, the energy storage device 40 is used as the last stage of kinetic energy output for transmitting kinetic energy to the wheel unit, and the power source 31 is entirely dedicated to increase the rotational speed of the flywheel 42. The flywheel rotational speed controller 68 is used for controlling the magnitude of kinetic energy to be provided by the power source 31 and cooperates with the speed reduction effect of the brake assembly 45 and rotational speed detection of the rotational speed detector 44 so as to control the rotational speed of the flywheel 42.

As such, when the rotational speed of the flywheel 42 is adjusted to match that of the power source 31, the second electronic control clutch 35 is controlled to effect interconnection therebetweeen. The kinetic energy input/output controller 67 cooperates with the flywheel rotational speed controller 66 for further control switching operations of the second electronic control clutch 35. When a brake is applied, the second electronic control clutch 35 is disengaged such that the kinetic energy of the wheel unit is transmitted to and entirely stored in the flywheel 42. The second electronic control clutch 35 is also operable to be disconnected so as to transfer the kinetic energy to the power source. In this state, if the power source 31 is of a motor/engine type, it can be discharged when the second electronic control switch 35 is disengaged. Only the kinetic energy of the flywheel 42 can be transmitted to the wheel unit. When the second electronic control switch 35 is engaged, the kinetic energy of the power source 31 can be transmitted to the wheel unit.

Hence, the seventh preferred embodiment of this invention further achieves the purpose of reducing the overall volume and weight of the automotive vehicle 200, reducing energy consumption, and reducing manufacturing cost.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An automotive vehicle comprising:
   a vehicle body including a wheel unit;
   a power transmission system mounted in said vehicle body and connected to said wheel unit, said power transmission system including a power source for driving said wheel unit;
   an energy storage device mounted in said vehicle body and including a flywheel;
   a continuously variable transmission mounted in said vehicle body and interconnecting said power transmission system and said energy storage device; and
   an electronic control device connected among said power transmission system, said energy storage device and said continuously variable transmission;
   wherein, when said automotive vehicle decelerates, said electronic control device connects said flywheel to said power transmission system through said continuously variable transmission so as to allow conversion of the kinetic energy of said power transmission system into stored rotational energy of said flywheel;
   wherein, when said automotive vehicle accelerates and when said electronic control device is operated to connect said flywheel to said power transmission system through said continuously variable transmission, the stored rotational energy of said flywheel is converted into the kinetic energy of said power transmission system for driving said wheel unit;

wherein, when said automotive vehicle accelerates and when said electronic control device is operated to disconnect said flywheel from said power transmission system through said continuously variable transmission, only said power source of said power transmission system drives said wheel unit.

2. The automotive vehicle as claimed in claim 1, wherein said power transmission system further includes:
   a first electronic control clutch connected to said power source,
   a first gearbox connected to said first electronic control clutch,
   a first axle unit connected to said first gearbox,
   a second electronic control clutch connected to said continuously variable transmission,
   a second gearbox connected to said second electronic control clutch, and
   a second axle unit connected to said second gearbox; and
   said wheel unit includes:
   a pair of front wheels linked to said first axle unit, and
   a pair of rear wheels linked to said second axle unit.

3. The automotive vehicle as claimed in claim 2, wherein said power source is a motor, said power transmission system further including a storage battery set connected electrically to said motor, and a solar power charging system connected to said storage battery set.

4. The automotive vehicle as claimed in claim 3, wherein said power transmission system further includes a first gearbox interconnecting said first electronic control clutch and said first axle unit, and a second gearbox interconnecting said second electronic control clutch and said second axle unit.

5. The automotive vehicle as claimed in claim 2, wherein said power transmission system further includes a first gearbox interconnecting said first electronic control clutch and said first axle unit, and a second gearbox interconnecting said second electronic control clutch and said second axle unit.

6. The automotive vehicle as claimed in claim 1, wherein said power transmission system further includes a first electronic control switching clutch interconnecting said power source and said continuously variable transmission, a gearbox connected to said first electronic control switching clutch, and an axle unit connected to said gearbox; and
   said wheel unit is linked to said first axle unit.

7. The automotive vehicle as claimed in claim 6, wherein said power source is a motor, said power transmission system further including a storage battery set connected electrically to said motor, and a solar power charging system connected to said storage battery set.

8. The automotive vehicle as claimed in claim 1, wherein said power transmission system further includes:
   a first electronic control clutch connected to said power source,
   a first gearbox connected to said first electronic control clutch,
   a first axle unit connected to said first gearbox,
   a second electronic control clutch connected to said continuously variable transmission,
   a second gearbox connected to said second electronic control clutch,
   a second axle unit connected to said second gearbox and
   a third electronic control clutch interconnecting said power source and said continuously variable transmission;
   said wheel unit includes:
   a pair of front wheels linked to said first axle unit, and
   a pair of rear wheels linked to said second axle unit.

9. The automotive vehicle as claimed in claim 8, wherein said power source is a motor, said power transmission system further including a storage battery set connected electrically to said motor, and a solar power charging system connected to said storage battery set.

10. The automotive vehicle as claimed in claim 8, wherein said third electronic control clutch is operable to transfer rotation between said flywheel and said power source under control of said electronic control device.

11. The automotive vehicle as claimed in claim 8, wherein said power transmission system further includes a first gearbox interconnecting said first electronic control clutch and said first axle unit, and a second gearbox interconnecting said second electronic control clutch and said second axle unit.

12. The automotive vehicle as claimed in claim 1, wherein said power transmission system further includes a first electronic control switching clutch interconnecting said power source and said continuously variable transmission, a gearbox connected to said first electronic control switching clutch, an axle unit connected to said gearbox, and an electronic control clutch interconnecting said power source and said continuously variable transmission;
   said wheel unit being linked to said first axle unit.

13. The automotive vehicle as claimed in claim 12, wherein said power source is a motor, said power transmission system further including a storage battery set connected electrically to said motor, and a solar power charging system connected to said storage battery set.

14. The automotive vehicle as claimed in claim 12, wherein said third electronic control clutch is operable to transfer rotation between said flywheel and said power source under control of said electronic control device.

15. The automotive vehicle as claimed in claim 1, wherein said power source includes an engine and a motor that are connected to said electronic control device;
   said power transmission system further including a first electronic control switching clutch interconnecting said engine and said motor, a second electronic control switching clutch interconnecting said first electronic control switching clutch and said continuously variable transmission, a gearbox connected to said second electronic control switching clutch, an axle unit connected to said gearbox, and an electronic control clutch connected among said first and second electronic control switching clutches and said continuously variable transmission;
   said wheel unit being linked to said axle unit.

16. The automotive vehicle as claimed in claim 15, wherein said electronic control clutch is operable to transfer rotation between said flywheel and said power source under control of said electronic control device.

17. The automotive vehicle as claimed in claim 1, wherein said power source is selected from the group consisting of an engines and a motor.

18. The automotive vehicle as claimed in claim 1, wherein said energy storage device further includes a housing for accommodation of said flywheel, and a movable ring mounted rotatably in said housing and surrounding and spaced apart from said flywheel, said movable ring being coaxial with and adjacent to said flywheel.

19. The automotive vehicle as claimed in claim 18, wherein said housing is made from a sound-proof material.

20. The automotive vehicle as claimed in claim 18, wherein said housing is filled with a gas having a density less than that of air.

21. The automotive vehicle as claimed in claim 18, wherein said movable ring is a ball bearing.

22. The automotive vehicle as claimed in claim 1, wherein said energy storage device further includes a rotational speed detector for detecting a rotational speed of said flywheel, said rotational speed detector being connected to said electronic control device such that said continuously variable transmission is disconnected from said power transmission system under control of said electronic control device when a brake is applied and when the rotational speed of said flywheel reaches a threshold value.

23. The automotive vehicle as claimed in claim 22, wherein said electronic control device includes a rotational speed display mounted on said vehicle body and connected to said rotational speed detector of said energy storage device for displaying the rotational speed of said flywheel.

24. The automotive vehicle as claimed in claim 1, wherein said energy storage device further includes a braking assembly connected to said flywheel.

25. The automotive vehicle as claimed in claim 1, wherein said energy storage device further includes an abnormal vibration detector for detecting abnormal vibration of said flywheel, said abnormal vibration detector being connected to said electronic control device for sending an abnormal vibration signal thereto, said electronic control clutch being configured to slow a rotational speed of said flywheel under control of said electronic control device when the abnormal vibration signal is received.

26. The automotive vehicle as claimed in claim 1, wherein said electronic control device includes a power output selection controller for selecting power output from one of said power source and said energy storage device.

27. The automotive vehicle as claimed in claim 1, wherein said electronic control device includes a brake selection controller connected to said energy storage device and operable to retard rotation of said wheel unit by means of said energy storage device.

28. The automotive vehicle as claimed in claim 1, wherein said electronic control device includes a speed ratio detector connected to said continuously variable transmission.

29. The automotive vehicle as claimed in claim 1, wherein said electronic control device includes an acceleration controller that has an accelerator pedal, and a first variable resistor connected to said accelerator pedal and configured to generate a variable resistance in accordance with a pressure exerted on said accelerator pedal to thereby result in a first variable voltage across said first variable resistor so that said electronic control device determines a speed a which said wheel unit is driven according to a change in the variable resistance.

30. The automotive vehicle as claimed in claim 29, wherein, when said accelerator pedal is abruptly depressed to thereby result in a dramatic change in said first variable voltage and when said flywheel accumulates sufficient stored rotation energy to drive said wheel unit through said continuously variable transmission, said electronic control device connects said flywheel to said power transmission system through said continuously variable transmission for outputting energy from said flywheel to drive said wheel unit.

31. The automotive vehicle as claimed in claim 1, wherein said electronic control device includes a deceleration controller that has a decelerator pedal, and a second variable resistor connected to said decelerator pedal and configured to generate a variable resistance in accordance with a pressure exerted on said decelerator pedal to thereby result in a second variable voltage across said second variable resistor so that said electronic control device determines a braking amount of said wheel unit according to a change in the variable resistance.

32. The automotive vehicle as claimed in claim 31, wherein, when said decelerator pedal is abruptly depressed to thereby result in a dramatic change in said second variable voltage and before said flywheel accumulates sufficient stored rotation energy to drive said wheel unit through said continuously variable transmission, said electronic control device interconnects said flywheel to said power transmission system through said continuously variable transmission so that kinetic energy from said wheel unit is rapidly converted into stored rotational energy of said flywheel.

33. An automotive vehicle comprising:
a vehicle body;
a wheel unit mounted on said vehicle body;
a power transmission system mounted in said vehicle body, said power transmission system including an axle unit linked to said wheel unit, a first electronic control clutch connected to said axle unit, a power source, and a second electronic control clutch connected to said power source;
an energy storage device mounted in said vehicle body, connected to said second electronic control clutch, and including a flywheel;
a continuously variable transmission mounted in said vehicle body and interconnecting said first electronic control clutch of said power transmission system and said energy storage device; and
an electronic control device connected among said power transmission system, said energy storage device, and said continuously variable transmission;
wherein, when said automotive vehicle decelerates, said electronic control device connects said flywheel to said axle unit through said continuously variable transmission and said first electronic control clutch for converting the kinetic energy of said power transmission system into stored rotational energy of said flywheel;
wherein, when said automotive vehicle accelerates, said electronic control device connects said flywheel to said axle unit through said continuously variable transmission and said first electronic control clutch so that rotational energy of said flywheel is converted into the kinetic energy of said power transmission system for driving said wheel unit;
wherein said electronic control device is operable to transmit the kinetic energy of said power source to said flywheel through said second electronic control clutch.

* * * * *